United States Patent [19]

Penn

[11] 4,125,214
[45] Nov. 14, 1978

[54] BUMPER GUARD-LUGGAGE CARRIER

[76] Inventor: Silas Penn, 5316 Sheridan Ave., Detroit, Mich. 48213

[21] Appl. No.: 830,956

[22] Filed: Sep. 6, 1977

[51] Int. Cl.² .................................................. B60R 9/06
[52] U.S. Cl. .................................... 224/42.08; 293/73
[58] Field of Search ............... 224/42.04, 42.07, 42.08, 224/42.03 R, 42.43, 42.44, 29 R, 42.45 R, 42.46 R, 42.13, 42.21; 293/64, 69 R, 73; 214/454

[56] References Cited

U.S. PATENT DOCUMENTS

| D. 153,593 | 5/1949 | Faulhaber | 293/64 X |
|---|---|---|---|
| 1,651,974 | 12/1927 | Specht | 293/73 X |
| 1,977,734 | 10/1934 | Monckmeier | 224/42.08 |
| 2,210,091 | 8/1940 | Marriott | 293/64 |
| 2,650,849 | 9/1953 | Poncher et al. | 293/64 |
| 2,789,854 | 4/1957 | Hope | 293/73 X |
| 3,282,368 | 11/1966 | Pittera | 293/64 UX |
| 3,912,098 | 10/1975 | Nicotra | 224/42.04 X |

Primary Examiner—Duane A. Reger
Assistant Examiner—Jerold M. Forsberg
Attorney, Agent, or Firm—Cullen, Sloman, Cantor, Grauer, Scott, & Rutherford

[57] ABSTRACT

A luggage carrier is provided for a vehicle having a body and a rear bumper. A pair of upright laterally spaced bumper guards bear against and are secured to said bumper transversely thereof. A U-shaped rack frame having a series of spaced cross bars, upon one end thereof is snugly interposed between and pivotally mounted upon said bumper guards. A pair of links are arranged upon opposite sides of the frame, each pair being pivotally interconnected with their one ends pivoted to the rack frame and with the other ends pivoted to the bumper guards. The links support the frame in a horizontal use position and permit upward tilting of the frame to a non-use storage position.

9 Claims, 5 Drawing Figures

BUMPER GUARD-LUGGAGE CARRIER

BACKGROUND OF THE INVENTION

Heretofore, it is known to provide luggage carriers upon some portion of the body, such as the roof or rear deck, or the fenders of the vehicle.

SUMMARY OF THE INVENTION

It is an object of the above invention to provide a combination bumper guard and luggage carrier with the bumper guards mounted upon the rear bumper and with the luggage carrier pivotally mounted upon the bumper guards with the carrier supported for a horizontal use position, and pivotal to a substantially upright non-use storage position.

It is another object to provide lateral reinforcements for the bumper guards relative to the bumper and to provide horizontal stabilizers adhered to the bumper guards, and vertical stabilizers supporting the horizontal stabilizers and secured to end portions of the vehicle bumper.

It is another object to provide an improved bumper guard incorporating said stabilizer mechanism.

It is a further object to provide an improved bumper guard for the front bumper of a vehicle and which includes a horizontally disposed grill guard with rearwardly extending end portions which overly portions of the bumper together with vertical stabilizers for anchoring such rearwardly extending portions to said bumper.

These and other objects will be seen from the following specification and Claims in conjunction with the appended drawing.

THE DRAWINGS

DETAILED DESCRIPTION OF THE INVENTION

Figure 1:
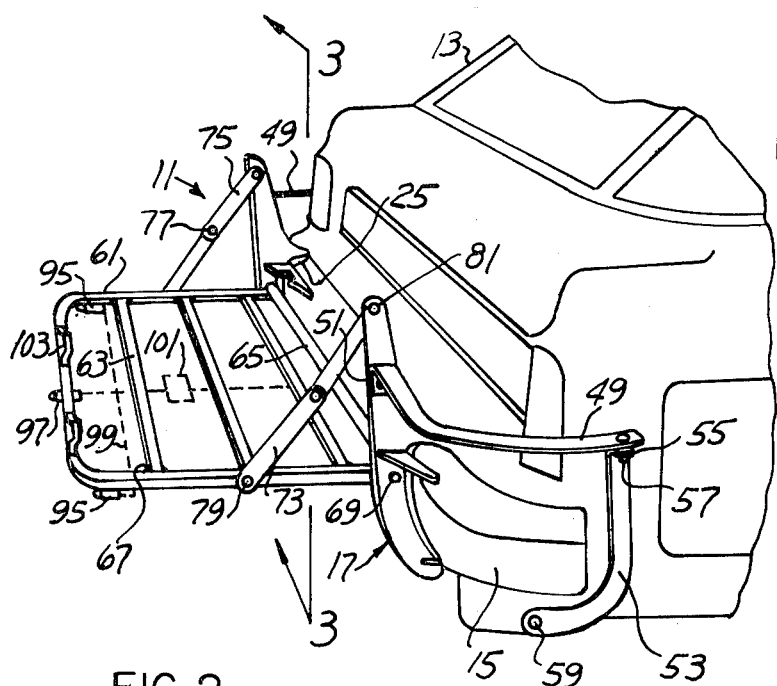
FIG. 1 is a fragmentary rear perspective view of a vehicle body, fragmentarily shown, to which the present bumper guard - luggage carrier has been assembled, the luggage carrier being in a horizontal use position.

Referring to FIGS. 1 through 4, the bumper guard - luggage carrier is generally indicated at 11 and mounted upon the vehicle 13, fragmentarily shown, and having a rear bumper 15.

A pair of upright laterally spaced bumper guards 17 each have a formed body 19 which bears against and is secured to the bumper transversely thereof and extends above and below said bumper.

The bumper has an arcuate face 21 and the body has formed in its rearward edge an arcuate recess 23 to cooperatively bear against said face of the bumper with a suitable rubber gasket 25 interposed therebetween.

Slotted bolt 27 receives edge portions of body 19 centrally of the recess 23 and is suitably secured to the body as by the welds 29. Said bolt extends rearwardly through the bumper face 21 and is fixedly secured thereto by the fastener or nut 31 with a suitable lock washer interposed, though not shown in the drawing. Secured upon opposite sides of the guard body are the triangularly shaped stabilizer wings 33 whose forward edges cooperatively and supportably bear against adjacent surface portions of said bumper.

Figure 3:
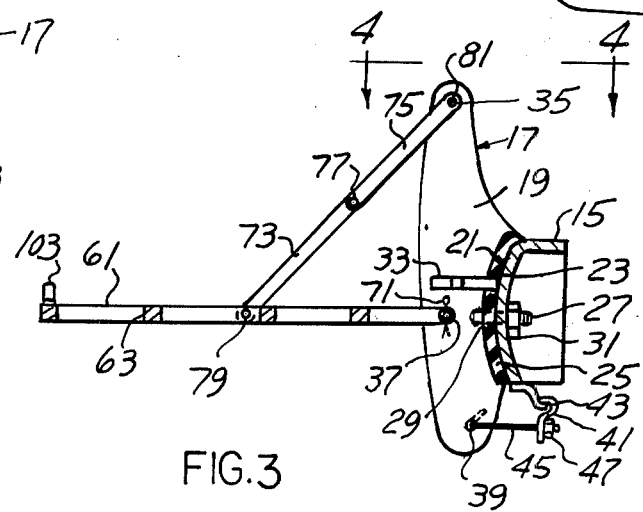
FIG. 3 is a fragmentary section taken in the direction of arrows 3—3 of FIG. 1.

As shown in FIG. 3, body 19 has transverse aperture 35 adjacent its upper end and central aperture 37 and a further aperture 39 adjacent its lower end.

Clamp strap 14 is apertured at its lower end, and at its upper end, has a forwardly extending portion which cooperatively registers with the forwardly extending flange 43 of said bumper.

Hook 45 at one end is projected through the body aperture 39 of the bumper guard with its opposite threaded end projected through the anchor strap 41 and drawn up tightly thereto by the nut or fastener 47.

The combination clamp strap and hook 45 serves to further anchor the bumper guard with respect to bumper 15.

Figure 2:
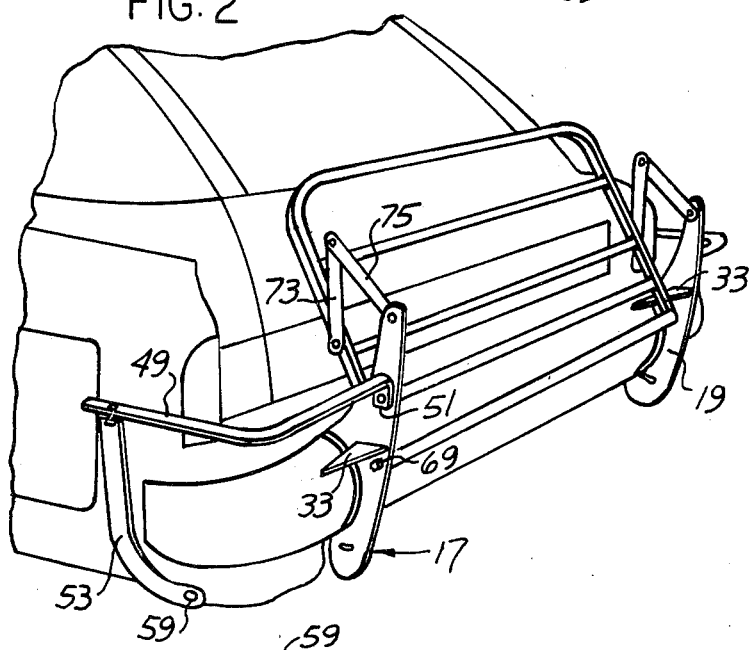
FIG. 2 is a rear perspective view of the vehicle taken from the opposite side, showing the luggage carrier tilted and adjacent to vehicle in a non-use storage position.

Horizontal stabilizer, or body guard 49, at one end has a downturned flange 51 which bears against the outer surface of each bumper guard and is suitably secured thereto as by welding or a suitable fastener. The horizontal stabilizer is arcuate in form and has a forwardly extending portion which overlies said bumper and is spaced outwardly from an adjacent portion of a vehicle body, as shown in FIGS. 1 and 2. The upright vertical stabilizer or body guard 53 at its upper end has a flange 55 which underlies and is secured to an end portion of the horizontal stabilizer 49, as by fastener 57. The vertical stabilizer is also arcuate in form and its rearwardly extending portion bears against an end portion of the bumper and is secured thereto by fastener 59.

Horizontal stabilizer 49 and the connected vertical stabilizer 53 provide further anchorage for the bumper guards respectively and also protectively enclose rear portions of the vehicle body.

Present luggage carrier frame 61 is of general U shape in plan and has a series of spaced cross bars 63 and an end cross tube 65 with cross bars and tube being welded at their ends as at 67 to portions of the frame.

One end portion of the luggage carrier frame is snugly interposed between the respective central portions of the bumper guards and pivotally connected thereto. For this purpose, there are provided headed pivot pins 69 which extend inwardly through the central apertures 37 of each bumper guard and project into the transverse tube 65 of the luggage carrier frame to provide a pivotal mounting therefore.

Cotter pins 71 extend transversely through end portions of the tube 65 and portions of said pivot pins for securing the pins in assembled position.

A pair of links 73, 75 are arranged upon opposite sides of the luggage carrier frame and are pivotally interconnected at 77. End portions of the links 73 are pivotally connected to intermediate side portions of the luggage carrier frame at 79. End portions of the upper links 75 are pivotally connected to the corresponding bumper guards as by the pivot pins 81.

The pivotal linkage means including the links 73 and 75 interconnected at 77 support the luggage carrier 61 in the horizontal use position shown in FIG. 1. When not in use, the luggage carrier frame may be folded upwardly to and adjacent the vehicle body as shown in FIG. 2, to a non-use or storage position. There is sufficient frictional contact of inner end portions of the luggage carrier frame 61 with respect to the bumper guards 17, such as to frictionally retain the luggage carrier frame in the storage position shown in FIG. 2.

With the luggage carrier frame 61 tilted to the non-use or storage position shown in FIG. 2, or completely removed, there is nevertheless provided an improved pair of rear bumper guards 17 which function in the conventional manner and which are laterally stabilized by the triangular wings 33 intermediate their ends, by the horizontal arcuate stabilizers 49 which extend outwardly and forwardly and the vertical stabilizers 53 which support the free ends of the horizontal stabilizers and extend downwardly and are secured to end portions of the rear bumper.

Amber side lights 95 and central red light 97, FIG. 1, are mounted on end portions of frame 61. Electrical circuit 99, normally within the frame tubing, is connected to the vehicle battery and includes mercury switch 101. The lights energize only when the carrier frame 61 is in horizontal use position.

MODIFICATION

Figure 5:
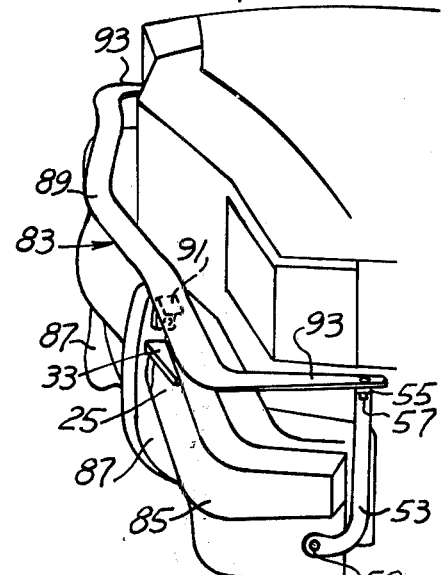
FIG. 5 is a fragmentary front perspective view of the front end of a vehicle with modified combination bumper guard and grill guard.
Figure 4:
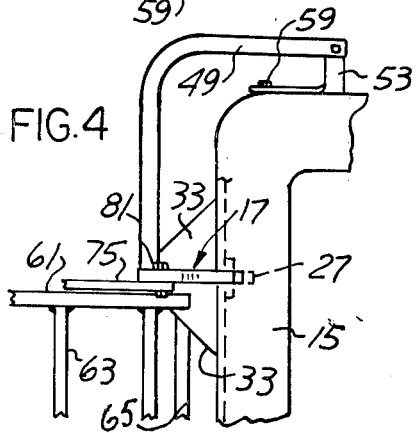
FIG. 4 is a fragmentary plan section taken in the direction of arrows 4—4 of FIG. 3.

A modified bumper guard at 83 is shown in the fragmentary perspective view, FIG. 5, for the vehicle 13, having a front bumper 85.

A similar pair of upright bumper guards 87 are mounted upon and extend transversely of said front bumper in the same manner as the securing of the rear bumper guards 17-19 of FIG. 3.

A formed horizontally disposed grill guard 89 overlies and spans the front bumper guards 87 and is suitably secured as by the angle fasteners 91 which depend from the grill guard and are affixed to upper portions of the corresponding bumper guards by a suitable fastening means.

The grill guard includes the opposed pair of rearwardly extending wings 93 whose free end portions overly end portions of the bumper 85 and are spaced outwardly of the body of the vehicle. Vertical stabilizers 53, the same as above described with respect to FIG. 1, are of general arcuate form at their upper ends, are outturned as at 55 and suitably secured to free end portions of the wings 93 as at 57. The lower forwardly extending portions of the vertical stabilizers bear against end portions of front bumper 85 and are secured thereto by fasteners 59, the same as above described with respect to FIG. 1.

Having described my invention, reference should now be had to the following claims:

I claim:

1. A luggage carrier for a vehicle having a body and a rear bumper, a pair of upright laterally spaced bumper guards bearing against and secured to said bumper transversely thereof and extending above and below said bumper;
a U-shaped rack frame having side members and a series of parallel spaced cross bars;
one end of said frame bearing against and interposed between said guards;
means pivotally mounting said frame upon said guards;
pivotal linkage means on opposite sides of said frame; and pivotally connected at their one ends to the side members of said rack frame and pivotally connected at their other ends respectively to said bumper guards at their upper ends; for supporting said frame in a horizontal use position and permitting upward tilting of the frame to adjacent said body to a non-use storage position;
each bumper guard comprising an elongated body;
there being an arcuate recess in the forward edge of said body adapted for cooperative registry with said bumper;
means securing said body to said bumper; a pair of arcuate horizontal stabilizers, each stabilizer at one end secured to one bumper guard, with its other end extending above said bumper; and an arcuate vertical stabilizer at one end secured to each horizontal stabilizer respectively, with its other end extending rearwardly and secured to said bumper.

2. In the luggage carrier of claim 1, the means securing said guards to said bumper including a bolt overlying and welded to said forward edge of said body at said recess, projected through said bumper; and a fastener on said bolt.

3. In the luggage carrier of claim 2, rear portions of said bolt being slotted to receive said guard body.

4. In the luggage carrier of claim 1, laterally extending stabilizer wings of substantially triangular shape secured to opposite sides of each bumper guard and cooperatively bearing against adjacent portions of said bumper.

5. In the luggage carrier of claim 1, said bumper having a lower forwardly extending flange; an apertured clamp strap opposed to and at one end overlying said flange; and an elongated hook anchored at one end within an aperture in said bumper guard body and with its other end projected through and secured to said clamp strap.

6. In the luggage carrier of claim 1, the means pivotally mounting said rack frame including a tube spanning the inner ends of the frame side members and secured thereto; opposed headed pivot pins extending through said bumper guards respectively and into end portions of said tube; and cotter pins extending through end portions of said tube and through said pins respectively.

7. In the luggage carrier of claim 1, each horizontal stabilizer having a downturned one end secured to each bumper guard, with its other end extending laterally outward; said vertical stabilizer having an outturned one end underlying and secured to said other end of each horizontal stabilizer.

8. In the luggage carrier of claim 1, laterally extending stabilizer wings of substantially triangular shape secured to opposite sides of each bumper guard and cooperatively bearing against portions of said bumper; said bumper having a lower forwardly extending flange; an apertured clamp strap opposed to and at one end overlying said flange; and an elongated hook anchored at one end within an aperture in said bumper guard body and with its other end projected through and secured to said clamp strap.

9. In the luggage carrier of claim 1, side and center lights mounted on rear portions of said frame;
and an electrical circuit on said frame adapted for connection to a vehicle battery, and a normally open mercury switch in said circuit, which closes when the frame is in horizontal use position.

* * * * *